June 17, 1969     F. T. BAILEY, JR     3,449,880
MASONRY BLOCKS
Filed March 1, 1967     Sheet _1_ of 2
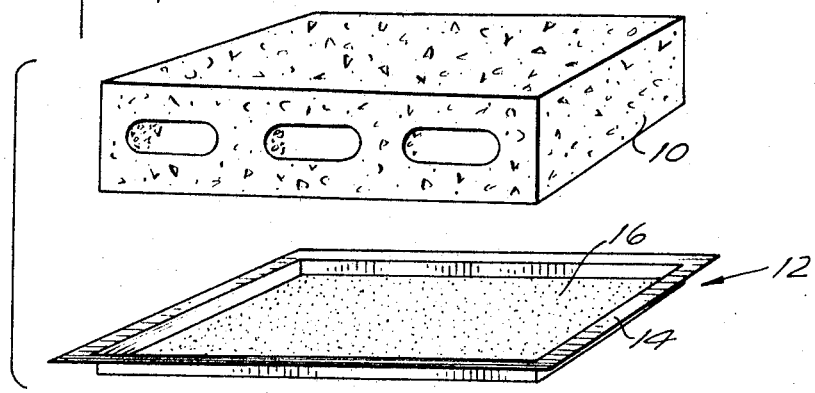
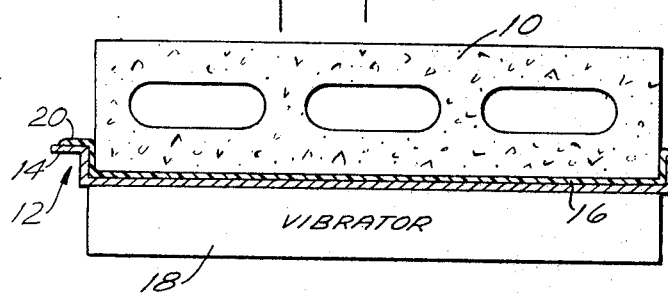
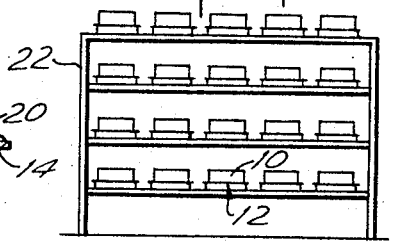
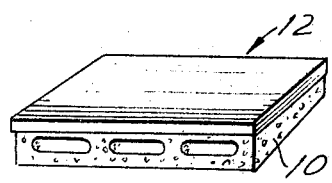
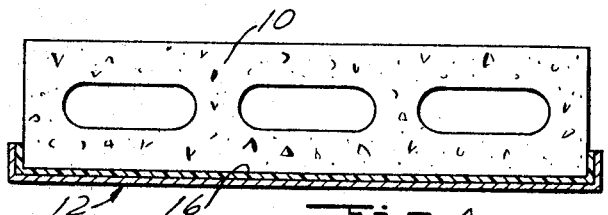
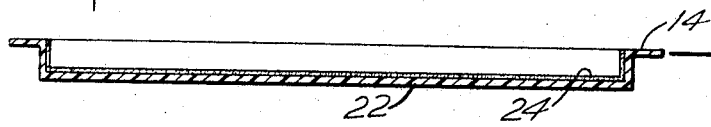
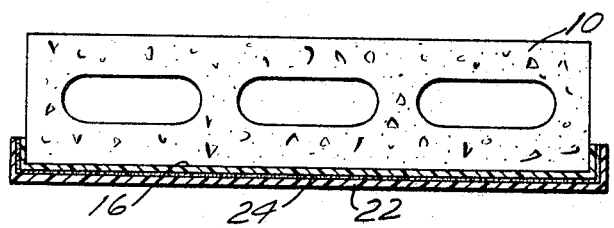
INVENTOR.
FRANK T. BAILEY JR.
BY
Ward, Haselton, McClennen, Brooks, & Fitzpatrick
ATTORNEYS

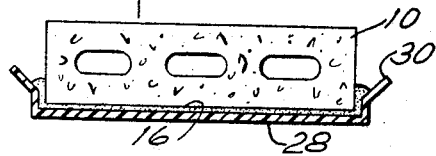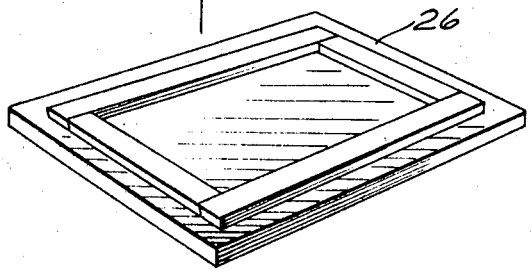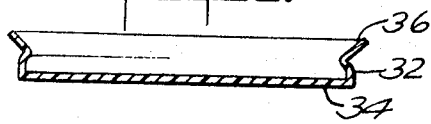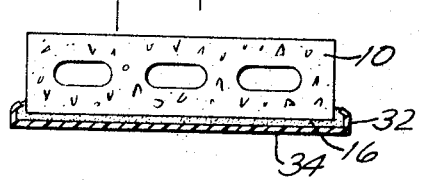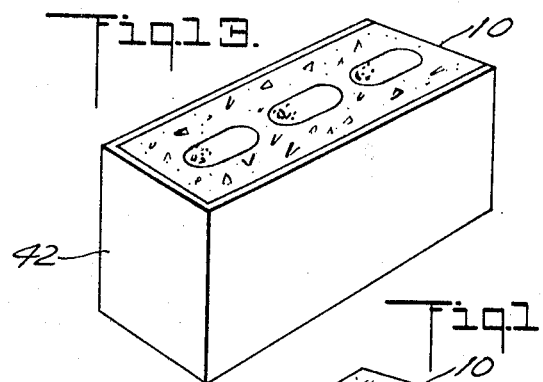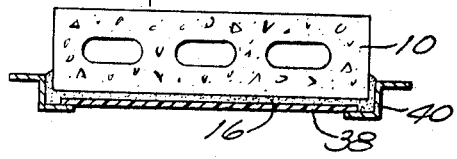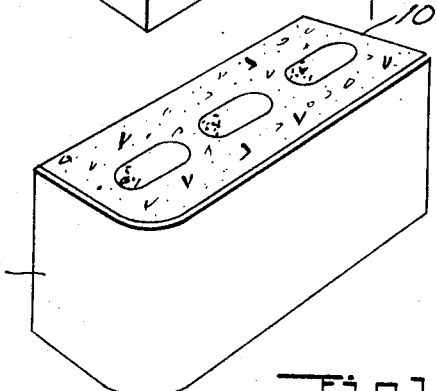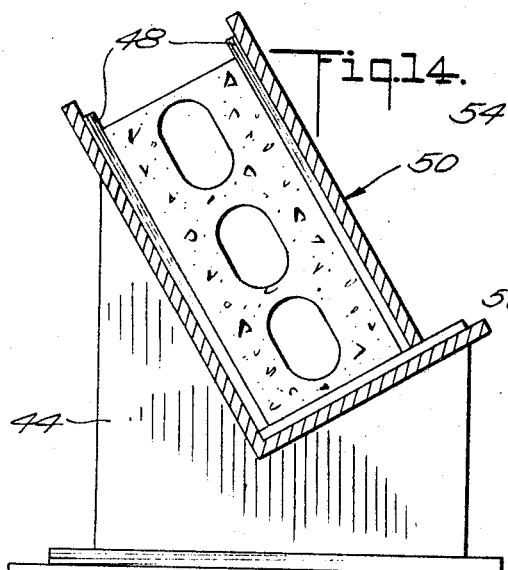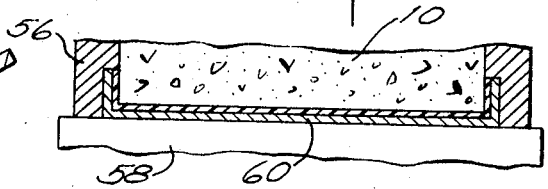
INVENTOR.
FRANK T. BAILEY JR.

United States Patent Office 3,449,880
Patented June 17, 1969

3,449,880
MASONRY BLOCKS
Frank T. Bailey, Jr., R.D. 1, Pittstown, N.J. 08867
Filed Mar. 1, 1967, Ser. No. 619,637
Int. Cl. E04c 1/40; B28b 1/08, 1/30
U.S. Cl. 52—309
6 Claims

ABSTRACT OF THE DISCLOSURE

A finished masonry block which includes a preformed facing in the shape of a shallow pan which is permanently adhered to the masonry block. The facing pan serves as a mold during fabrication and as the finished facing thereafter. The bonding material for adhering the facing comprises about 220 parts by weight of finely divided sand, about 75 parts by weight of portland cement and about 70 parts by weight of an acrylic polymer in a water base having about 28% solids.

---

This invention relates to construction material and more particularly to a faced masonry block which may be decorative.

Masonry building blocks, such as cinder blocks, cement blocks, asbestos-cement blocks, or the like are basic to the building industry. However, they are drab in appearance and their surfaces are rough and difficult to paint. Furthermore, as they become dirty in service, they are difficult, if not impossible, to wash or clean.

Heretofore, attempts have been made to provide special surfaces on the portions of the blocks exposed to view, but these have not proven entirely satisfactory, for one reason or another. For example, color glaze has been applied to the surface of a block, but the block still has a rough surface with literally thousands of pores or holes that catch dust and dirt over a period of time, making cleaning difficult. Other blocks have been made with the exposed face being of sanded marble aggregate. However, these are very vulnerable to chipping during handling and installation. In still other instances, building blocks have been employed with polyester plastic faces. Due to the low impact strength of this material, there is a very great problem of chipping during handling. Moreover, the block must be completely dry prior to the application of the polyester facing, which means that the blocks must be brought in from outside storage areas and oven dried prior to fabrication. Also fabrication requires the use of molds which are initially expensive. These molds are difficult to remove from the cured block and are also difficult to clean prior to reuse because they require chemical cleaning.

According to one aspect of my invention, I provide a method of facing masonry blocks which includes the steps of taking a preformed facing which may be an abrasion and weather resistant material such as synthetic plastics, preferably polyvinyl chloride, or a metallic material, as for example stainless steel or aluminum, and may be as thin as 0.0005 inch thick. The facing is in the shape of a shallow pan which may have a circumferential lip extending around the top edge thereof. The next step is to fill the facing pan with bonding material which may include a mixture of about 225 parts by weight of finely divided sand, about 75 parts by weight of portland cement and about 70 parts by weight of an acrylic polymer in a water base having about 28% solids. Thereafter, the block is positioned in said facing pan. The pan with the block so disposed therein is vibrated until the bonding material enters the interstices of the block and runs out onto the lip. Thence, the blocks and facing pans are allowed to set for about two hours or longer. The facing material is thus securely adhered to the block and becomes a facing for said block which is attractive and weather and abrasion resistant. At this time the finished block is ready to be palleterized and steel strapped for shipment. If the facing has a circumferential lip, this may be trimmed after about an hour subsequent to manufacture.

In accordance with another aspect of the invention, the facing pan is placed on a pallet. Then the facing pan is filled with bonding material which may include a mixture of about 225 parts by weight of finely divided sand, about 75 parts by weight of portland cement and about 70 parts by weight of an acrylic polymer in a water base having about 28% solids. Then, the pallet is vibrated until the bonding material is level. Thereafter, the block is positioned in the facing pan and the pallet is again vibrated until the bonding material enters the interstices of the block and runs out onto the lip. Then the bonding material is allowed to set or cure for about one hour. At that time the assembly is turned over the pallet is removed for reuse. Any time after about one hour the edges may be razor trimmed. After the blocks and facing pans have been allowed to set for about two hours or longer, they are ready to be washed in water, palletized and steel strapped for shipment.

Further, according to another aspect of my invention, there resides the provision of a new and improved finished masonry block which comprises a preformed facing in the shape of a shallow pan, a bonding material permanently adhering the pan to one side of the block, the pan extending partially around the edges of the sides adjacent said side. The bonding material comprises about 225 parts by weight of finely divided sand, about 75 parts by weight of portland cement, about 70 parts by weight of an acrylic polymer in a water base having about 28% solids.

A feature of this invention resides in the provision of a new and improved finished masonry block which is dust-proof, which renders the masonry block moisture-proof, which is readily usable indoors or outdoors, which includes a facing that covers the ragged edges of the block and provides a finished wall that may be a bearing wall, and which incorporates a facing that may have various coloring effects and textures.

Another feature of my invention resides in the provision of a finished masonry block which employs the facing material itself as a manufacturing mold, and hence, is not removed subsequent to the curing step, which may be easily cleaned in water, which may be fabricated from a bar block that is not entirely dry, which has high impact strength and hence very little chippage, which can be provided with a very thin facing, and which may have a facing of various selected shapes and contours.

According to the invention, as another feature thereof, there is provided a finished masonry block which is adaptable for large or small quantity production, which has a very good bond between the facing material and the block due to the depth of penetration of the bonding material into the interstices of the block, and which is adaptable for many types of faces including vinyl (such as polyvinyl chloride and other polymers containing at least 50% by weight of vinyl chloride), polystyrene, vinyl-asbestos, polyethylene, melamine and metals such as stainless steel, aluminum or the like. The aluminum may be anodized for varying color effects and the vinyl may be provided with reverse printing for providing designs that will not wear away.

As still another feature of my invention there is provided a new and improved finished masonry block, which is economical, which is practical, which doesn't tie up expensive equipment during fabrication and which is very suitable for its intended purposes.

I have thus outlined rather broadly the more important features of my invention in order that the detailed description thereof that follows my be better understood, and in order that my contribution may be better appreciated. There are, of course, additional features of my invention that will be described hereinafter which will form the subject of the claims appended hereto. Those skilled in the art will appreciate that the conception on which my disclosure is based may readily be utilized as the basis for the designing of other structures for carrying out the several purposes of my invention. It is important therefore, that the claims be regarded as including such equivalent constructions as do not depart from the spirit and scope of my invention.

Specific embodiments of the invention have been chosen for purposes of illustration and description, and are shown in the accompanying drawings, forming a part of the specification, wherein:

FIG. 1 is a perspective view of a preformed facing in the shape of a shallow pan containing bonding material and a masonry block to be faced according to the concept of this invention;

FIG. 2 is a vertical sectional view of the masonry block positioned in the bonding material in the facing pan, and mounted on a vibrator;

FIG. 3 is a side elevation, drawn to a reduced scale, of a plurality of masonry blocks disposed in facing pans and positioned on racks for curing;

FIG. 4 is a vertical sectional view of a finished masonry block constructed according to the concept of the invention;

FIG. 5 is a perspective view, drawn to a reduced scale, of the finished masonry block of FIG. 4;

FIG. 6 is a vertical sectional view of a vinyl preformed facing in the shape of a shallow pan having a coating of tackified latex on its inside surface;

FIG. 7 is a vertical sectional view of a finished masonry block of another embodiment of the invention;

FIG. 8 is a perspective view of a pallet for use in fabricating a finished masonry block according to this invention;

FIG. 9 is a vertical sectional view of the masonry block in combination with a facing pan of another embodiment of my invention;

FIG. 10 is a side elevational view of a facing pan in accordance with still another form of the invention;

FIG. 11 is a vertical sectional view of the facing pan of FIG. 9 mounted on a standard masonry block;

FIG. 12 is a vertical sectional view of still another form of facing pan;

FIG. 13 is a perspective view of a masonry block with a facing pan or facing of special configuration mounted thereon;

FIG. 14 is a vertical sectional view of a pallet for holding facing pans of special configurations;

FIG. 15 is a perspective view of a curved or bullnose facing for mounting on a masonry block; and FIG. 16 is a schematic vertical sectional view of an automatic block making machine adapted to make finished blocks incorporating facings according to my invention.

In the embodiment of the invention according to FIGS. 1–5, there is illustrated a masonry block 10 which may be a cinder block, cement block, or an asbestos-cement block, for example. This block may be of standard size, such as 8 by 16 inches nominal, for example. A preformed facing indicated generally at 12 is in the shape of a shallow pan of about ½ inch depth, and has a circumferentially extending lip 14 of about 1 inch width on the top thereof. This facing, which may be stainless steel or aluminum may have a thickness of as little as .0005 inch. Usually the facing thickness is between about .010 and about .040 inch. According to my invention, the facing pan is filled with bonding material 16 comprising a mixture of finely divided sand, portland cement, an acrylic polymer in a water base.

I have found that the granular size of sand used is very important in order to obtain the desired depth of penetration of the bonding material into the surface of the masonry block, and also to obtain the desired floatability under the weight of a vibrating block to obtain a preferable bonding film thickness of between about .025 inch and about .035 inch. I have found that the following is a satisfactory bonding material mix:

1 part by weight No. 4 silica sand, 60–100 mesh,
1 part by weight No. 10 silica sand, 100–150 mesh,
1 part by weight No. 16 silica sand, 120–220 mesh,
1 part by weight 6/0 quartz sand, 90% through 325 mesh,
1⅓ part by weight portland cement,
From 1 part to 1.5 parts by weight of the acrylic polymer Rhoplex MC–4530 in a water base having about 28% solids.

The term "acrylic polymer" as used herein and in the appended claims is intended to refer to homopolymers or interpolymers of acrylic acids, methacrylic acids, and their alkyl esters. Suitably acrylic polymers should be sufficiently flexible to form continuous fibers, have adequate light and age resistance and adheres strongly to concrete, cement, plastic and metallic materials. Examples of such suitable acrylic polymers include polymers of alkyl containing from 1 to 8 carbon atom esters of acrylic or methacrylic acid as for example ethyl acrylate, methyl methacrylate, butyl acrylate, and 2-ethyl hexyl acrylate and methacrylate. Especially suitable interpolymers include interpolymers of ethyl acrylate, acrylic acid, methacrylic acid, or itaconic acid, and methyl methacrylate in which the major portion of such interpolymer is methyl methacrylate. This acrylic polymer bonding material is desirably used in aqueous emulsion form and diluted in such fashion as to make the resultant composition of a viscosity and character suitable for application.

It is most preferred to employ the acrylic polymer in aqueous emulsion form manufactured by Rohm & Haas of Philadelphia, Pa., and marketed under their trade name Rhoplex MC–4530, and which has been diluted in the ratio of 5 parts MC–4530 to 3 parts water.

Alternately, I have found that the following bonding sand material mix has been satisfactory:

4½ parts by weight banding sand,
1 part by weight 6/0 quartz sand,
2 parts by weight high early strength portland cement,
About 1.5 to about 1.87 parts by weight of Rhoplex MC–4530 an acrylic polymer in a water base having 28% solids.

The banding sand has a typical screen analysis as follows:

|     | Mesh |
| --- | --- |
| 3% | 50 |
| 28% | 80 |
| 42% | 100 |
| 22% | 140 |
| 3% | 200 |

Preferably, the portland cement is of the high early strength type because it decreases curing time, and hence, decreases handling time.

Thereafter, the masonry block 10 is positioned in the facing pan 12, as best seen in FIG. 2. The pan is then placed on a vibrator 18 and the assembly is vibrated until the bonding material enters the interstices of the block and runs out of the lip 14 as at 20.

The next step in my method is to place the block and pan onto a drying rack 22, FIG. 3 and allow it to cure or set. It will be appreciated that according to my invention setting or curing takes place at room temperature and special elevated temperatures for substantial periods of time are not necessary. After the blocks and facing pans have been allowed to cure for about one hour, the lip 14 and the excess bonding material 20 are trimmed off. After about two hours of curing the so-faced block may be cleaned by merely washing in water. At this time the block is finished, as best seen in FIGS. 4 and 5.

In the embodiment of my invention shown in FIGS. 6 and 7, a vinyl facing 22 is provided in a preformed shallow pan shape. The facing pan 22 is covered with a coating 24 which is sprayed or brushed on the vinyl before the bonding emulsion 16 is applied. This coating is a natural or synthetic rubber latex formulation tackified with a tackifying resin such as phenol aldehyde or polyterpene resin particularly suitable tackified rubber latex formulation is that supplied by the International Latex and Chemical Corporation under the trade name of Paisley No. 7262. Also, suitable for this coating are two formulations supplied by Pittsburgh Plate Glass Company under the trade names of Bondmaster K 480 and Bondmaster K 218–34. When utilizing either of these formulations, it is desirable to remove the solvents by any known technique, such as by air drying. The other steps required for facing the masonry block of the embodiments of FIGS. 6 and 7 are identical to the steps described hereinbefore in connection with the embodiment of FIGS. 1–5, the finished masonry block being shown in FIG. 7.

In another form of my invention, the facing pan 14 is first positioned in a pallet 26, FIG. 8. Then the pan 14 is filled with bonding material 16 and is placed on a vibrating table to level the bonding material. A hand trowel may be used to speed-up the leveling process. Thence, the masonry block 10 is positioned in the facing pan 12 as seen in FIG. 2. Thereafter, the assembly is vibrated until the bonding material fills the interstices of the block, and excess bonding material flows out on the lip of the facing pan and the operator may remove the excess by a sweep with a putty knife. If there is insufficient bonding material to fill the facing pan around the block, then the operator can add some at this stage. The block and facing pan are allowed to cure for about an hour and then the block and facing pan are turned over and the pallet is removed for reuse. Any time after about an hour, the edges 14, FIG. 6, of the facing pan may be trimmed. Actually, the bonding material is somewhat soft at this point, but I have found in practice that after a little experience, the operator can razor slit a plastic lip with little or no disturbance to the setting of the bonding material. Within about two hours after manufacture, the finished block can be palletized and steel strapped for shipment. It is noted that the block and facing pan can be cleaned after manufacture by merely washing in water.

It will be appreciated that it may be desirable to dispense with the lip 14 of the facing pan 12 or 22. This is particularly true when the facing material is metallic. In this case, the facing pan will initially appear as shown in FIGS. 4 and 7. The processes as described above will be employed except that the trimming steps will be dispensed with and the excess bonding material will be wet sponged off at the completion of the vibrating stage. It will be appreciated that immediately after the vibrating step, the block and facing pan can be turned face up as the bonding will not flow from the sides and this makes it easier to clean the edges.

The facing pan may take the form of various shapes and configurations. FIG. 9 shows a facing pan 28 having an angularly upstanding lip or rim 30 so that the bonding material when being vibrated will not spill out. The lip 30 is subsequently trimmed in the same manner as described hereinbefore in connection with lip 14.

Further, according to my invention, instead of using a metallic or plastic facing pan as described above, the facing pan is fabricated from polyethylene. The facing 22, FIGS. 6 and 7, is not employed. In this embodiment I may use a white cement with an added dry color in the bonding material. After applying the bonding material 16 in any one of the processes described above, and after the bonding material has cured or set of the order of about seventy two hours, I can pull off the polyethylene face, leaving a very smooth facing or surface. As one of the features of this embodiment, the polyethylene face may be left on the block as a cover for protection during shipping and handling until just before the block is to be installed at the job site. Then, the polyethylene face is removed. Due to the fact that the bonding material 16 has excellent sun resistance characteristics, this form of finished block is ideal for outdoor applications.

As best seen in FIGS. 11 and 12, the side walls 32 of facing pan 34 may be arcuately shaped to serve as a locking edge. The facing pan is initially employed with an angularly disposed lip 36 which serves to prevent spillage during the vibration step. Thereafter, the lip 36 is trimmed and the finished product has the appearance as shown in FIG. 11.

Referring next to FIG. 12, there is shown still another form of facing pan incorporating two pieces. That is, the bottom 38 may be a flat piece of melamine, for example, which is held in position by a metallic or plastic frame 40. The metal frame 40 may be removed subsequent to curing, if desired.

It will be appreciated that a plurality of faces may be applied to a single block. This may be done by repeating one of the above processes with respect to the other side of the block after completing the first side. Also, as best seen in FIG. 13, a one piece metallic or plastic facing 42 may be applied to a number of surfaces simultaneously. In this case, the facing is shaped to its final form. Coating material, such as that shown at 24, FIGS. 6 and 7 is applide if the facing material is plastic and omitted if the facing material is metallic, and then the bonding material is applied therein by a trowel. Thereafter, the block is slipped into the facing and the assembly is placed on a 90° V-shaped pallet 44 (FIG. 14). This pallet includes a pair of guide rails 48 and means for applying a weight 50. The pallet is placed on a vibrating table 52. C-clamps may be used to force the excess bonding material out of the sides. Then the C-clamps are removed and the so-fabricated assembly is treated in the same manner as described hereinbefore in connection with the embodiment of FIGS. 1–5.

As seen in FIG. 15, the lining 54 may have a rounded corner, if desired. This is called a bullnose and is fabricated on the pallet, as shown in FIG. 14.

Referring to FIG. 16 there is shown another form of my invention wherein a block making machine 56 is employed. The pan 58 of the block making machine is removed and a metal on plastic facing 60 is made to just fit the pan 58. Then the inside of the facing 60 is coated with my bonding material 16 and allowed to set about two or three minutes. Then the block material is added and the block is made up in the usual manner by clamping and vibrating, or by tamping. I have found that the following material is satisfactory for making the block.

1 part by weight non-shrinking portland cement,
1 part by weight banding sand,
1 part by weight local contractor's sand,
4 parts by weight Nytralite (expanded shale as supplied by the New York Trap Rock Corp.)
An emulsion of Rhoplex MC–4530, an acrylic polymer in a water base having about 28% solids is added to the above mixture until the mix becomes plastic.

This material served to make satisfactory finished block having the necessary properties of building masonry blocks.

Although particular embodiments of the invention are herein disclosed for purposes of explanation, various modifications thereof, after study of this specification, will be apparent to those skilled in the art to which the invention pertains.

What is claimed and desired to be secured by Letters Patent is:

1. A faced structural module comprising a masonry block and a preformed facing in the shape of a shallow pan secured to exposed surfaces of said block, said preformed facing being vinyl and having a coating of tackified rubber latex and its contacting surface, a bonding material permanently adhering said pan to one side of said block, said pan extending partially around the edge of the side adjacent said one side, said bonding material having about 220 parts by weight of finely-divided sand, about 75 parts by weight of portland cement, and about 70 parts by weight of an acrylic polymer in a water base having about 28% solids.

2. A faced structural module according to claim 1 wherein said preformed facing has a thickness of between about .010 inch and about .040 inch.

3. A faced structural module according to claim 1 wherein said portland cement is early strength portland cement.

4. A faced structural module according to claim 1 wherein said bonding material has a thickness of between .025 inch and about .035 inch.

5. A faced structural module according to claim 1 wherein said finely divided sand comprises:
   about 1 part by weight No. 4 silica sand 60–100 mesh,
   about 1 part by weight No. 10 silica sand 100–150 mesh,
   about 1 part by weight No. 16 silica sand 120–220 mesh,
   about 1 part by weight 6/0 quartz sand 90% through 325 mesh.

6. A faced structural module according to claim 1 wherein said sand has a screen analysis about as follows:

| Percent | Mesh |
| --- | --- |
| 3 | 50 |
| 28 | 80 |
| 42 | 100 |
| 22 | 140 |
| 3 | 200 |

References Cited

UNITED STATES PATENTS

| | | | |
| --- | --- | --- | --- |
| 2,453,223 | 11/1948 | Henderson | 52—173 |
| 2,751,775 | 6/1956 | Sergovic | 52—309 |
| 2,827,385 | 3/1958 | Lyons | 106—90 |
| 2,868,753 | 1/1959 | Morgan | 260—41 |
| 3,145,502 | 8/1964 | Rubenstein | 52—309 |

FOREIGN PATENTS

| | | |
| --- | --- | --- |
| 258,725 | 12/1963 | Australia. |
| 523,407 | 4/1956 | Canada. |
| 567,358 | 12/1958 | Canada. |
| 804,358 | 11/1958 | Great Britain. |
| 1,014,795 | 12/1965 | Great Britain. |

HENRY C. SUTHERLAND, *Primary Examiner.*

U.S. Cl. X.R.

52—599; 117—123, 138.8; 161—162, 165, 242; 260—41